(12) United States Patent
Matsumura et al.

(10) Patent No.: US 12,388,316 B2
(45) Date of Patent: Aug. 12, 2025

(54) ROTATING DEVICE AS AN ACTUATOR

(71) Applicant: MINEBEA MITSUMI Inc., Nagano (JP)

(72) Inventors: Yukimasa Matsumura, Kitasaku-gun (JP); Koichiro Hirabayashi, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 252 days.

(21) Appl. No.: 18/307,075

(22) Filed: Apr. 26, 2023

(65) Prior Publication Data

US 2024/0079925 A1    Mar. 7, 2024

(30) Foreign Application Priority Data

May 2, 2022    (JP) ................... 2022-075917

(51) Int. Cl.
*H02K 5/04*    (2006.01)
*H02K 7/116*    (2006.01)

(52) U.S. Cl.
CPC ............... *H02K 5/04* (2013.01); *H02K 7/116* (2013.01)

(58) Field of Classification Search
CPC .. H02K 5/04; H02K 5/08; H02K 5/22; H02K 5/225; H02K 7/116; H02K 7/1163; H02K 7/1166
See application file for complete search history.

(56) References Cited

U.S. PATENT DOCUMENTS

| | | | | |
|---|---|---|---|---|
| 5,028,084 A * | 7/1991 | Fukumoto | ............... | E05B 81/50 292/201 |
| 6,398,582 B1 * | 6/2002 | Matsuyama | ......... | H01R 13/743 174/152 G |
| 10,305,349 B2 | 5/2019 | Lukacsel | | |
| 2016/0301283 A1 | 10/2016 | Lukacsel | | |
| 2019/0356209 A1 * | 11/2019 | Yokoyama | ............. | H02K 37/16 |

FOREIGN PATENT DOCUMENTS

| | | | |
|---|---|---|---|
| JP | 2009171686 A | * | 7/2009 |
| JP | 2014-027773 A | | 2/2014 |
| JP | 2016-540941 A | | 12/2016 |

OTHER PUBLICATIONS

Otawara, Machine Translation of JP2009171686, Jul. 2009 (Year: 2009).*

* cited by examiner

*Primary Examiner* — Eric Johnson
(74) *Attorney, Agent, or Firm* — Chrisman Gallo Tochtrop LLC (57) ABSTRACT

A rotating device includes a housing, a motor, and one or more gears. The housing includes a first housing and a second housing engaging with the first housing. The motor and the one or more gears are accommodated in the housing. The first housing and the second housing oppose one another in a first direction. A side wall part of the second housing is provided with a first hook, and a side wall part of the first housing is provided with a first protruding part. The first protruding part engages with the first hook. A surface of the first hook engaging with the first protruding part and a surface of the first protruding part engaging with the first hook are in contact with one another in the first direction. The surface of one of the first hook and the first protruding part is inclined with respect to the surface of the other of the first hook and the first protruding part, and the surface of the first protruding part faces the side wall part of the first housing.

3 Claims, 9 Drawing Sheets

ROTATING DEVICE AS AN ACTUATOR

CROSS-REFERENCE TO RELATED APPLICATIONS

This application claims benefit of priority to Japanese Patent Application No. JP2022-075917 filed on May 2, 2022. The entire contents of the above-identified application are hereby incorporated by reference.

TECHNICAL FIELD

The present invention relates to a rotating device.

BACKGROUND ART

An example of a known rotating device used in an actuator or the like includes a rotating device accommodating a motor and gears within a pair of engaging housings. For example, a known motor apparatus includes a tongue-like protruding part being elastically deformable and formed on either a case or a cover, and a catch part being engageable with the protruding part and formed on the other, and the protruding part and the catch part engage by snap-fit.

CITATION LIST

Patent Literature

PTL 1: JP 2016-540941 A
PTL 2: JP 2014-027773 A

SUMMARY OF INVENTION

Technical Problem

However, when a housing is assembled using an engagement part, the engagement is easily disengaged when a reaction force caused by vibration of the motor or the like is applied to the engagement part. This may decrease the reliability of the rotating device.

An object of one aspect is to realize a rotating device with high reliability.

Solution to Problem

In one aspect, a rotating device includes a housing, a motor, and one or more gears. The housing includes a first housing and a second housing. The second housing engages with the first housing. The motor and the one or more gears are accommodated in the housing. The first housing and the second housing oppose one another in a first direction. A side wall part of the second housing is provided with a first hook, and a side wall part of the first housing is provided with a first protruding part. The first protruding part engages with the first hook. A surface of the first hook engaging with the first protruding part and a surface of the first protruding part engaging with the first hook are in contact with one another in the first direction. The surface of one of the first hook and the first protruding part is inclined with respect to the surface of the other of the first hook and the first protruding part, and the surface of the first protruding part faces the side wall part of the first housing.

According to an aspect, a rotating device with high reliability can be realized.

DESCRIPTION OF EMBODIMENTS

An embodiment of a rotating device disclosed in the present application is described below in detail with reference to the drawings. The dimensional relationship of elements and the ratio of the elements in the drawings may differ from an actual configuration. The drawings may each include parts having mutually different dimensional relationships and proportions. In order to facilitate description, each drawing may be illustrated using a coordinate system, where the extension direction of a rotation shaft 31 of a motor 3 described below is defined as the X-axis direction, and the extension direction of an output shaft 51 described below orthogonal to the rotation shaft 31 is defined as the Z-axis direction.

EMBODIMENTS

Figure 1:
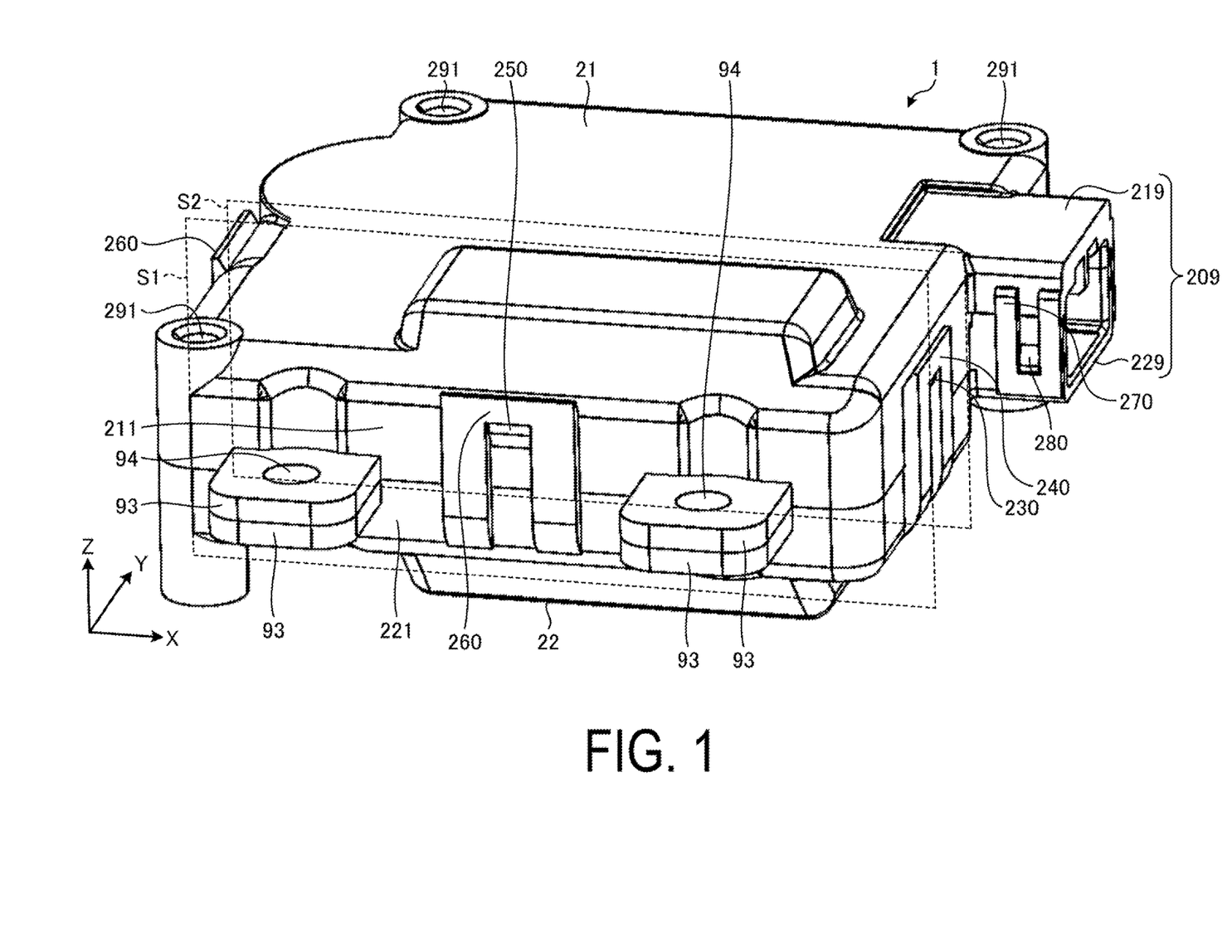
FIG. 1 is a perspective view illustrating an example of a rotating device according to an embodiment.
Figure 2:
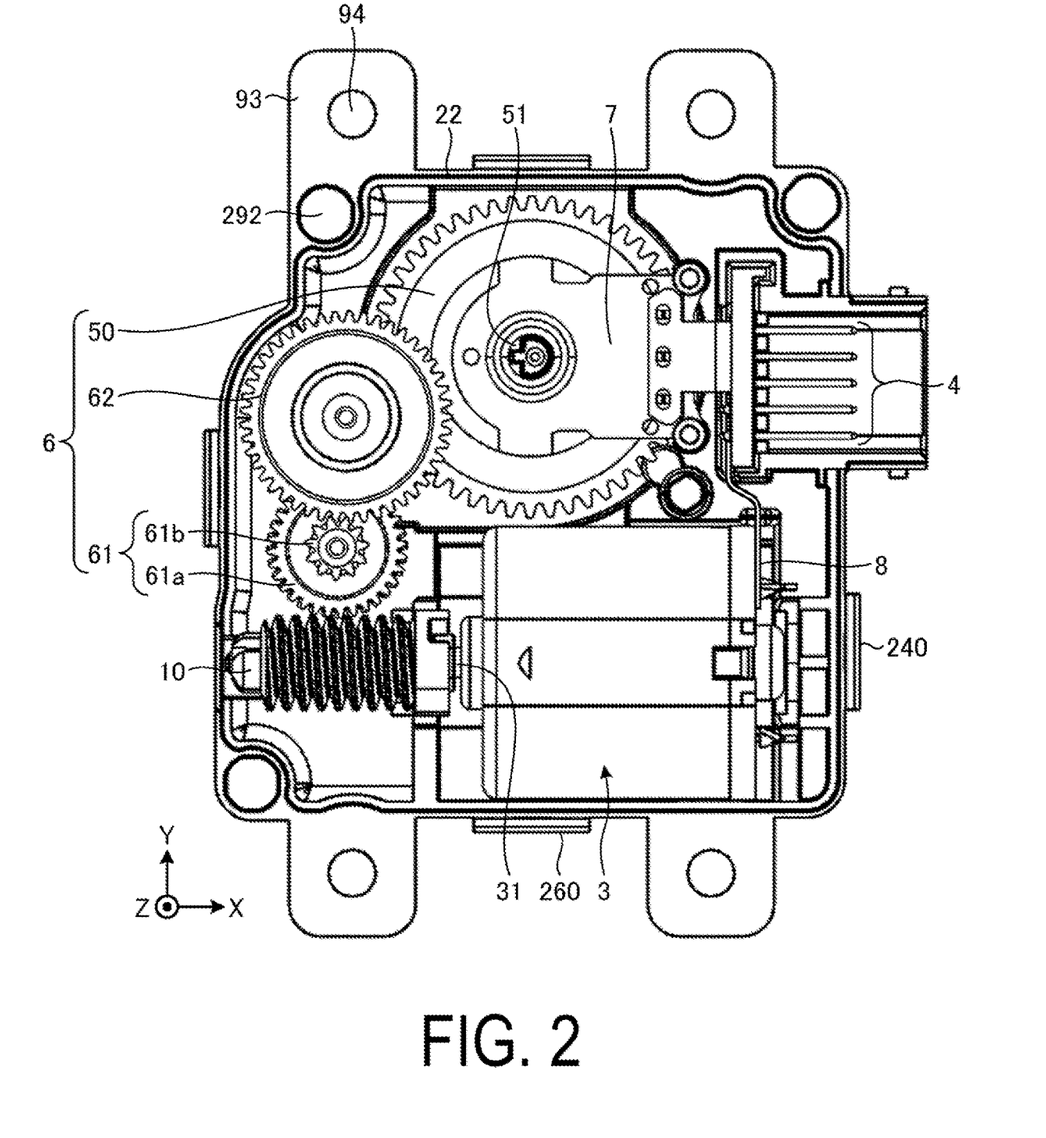
FIG. 2 is a plan view illustrating a rotating device according to an embodiment with a first housing removed.
Figure 3:
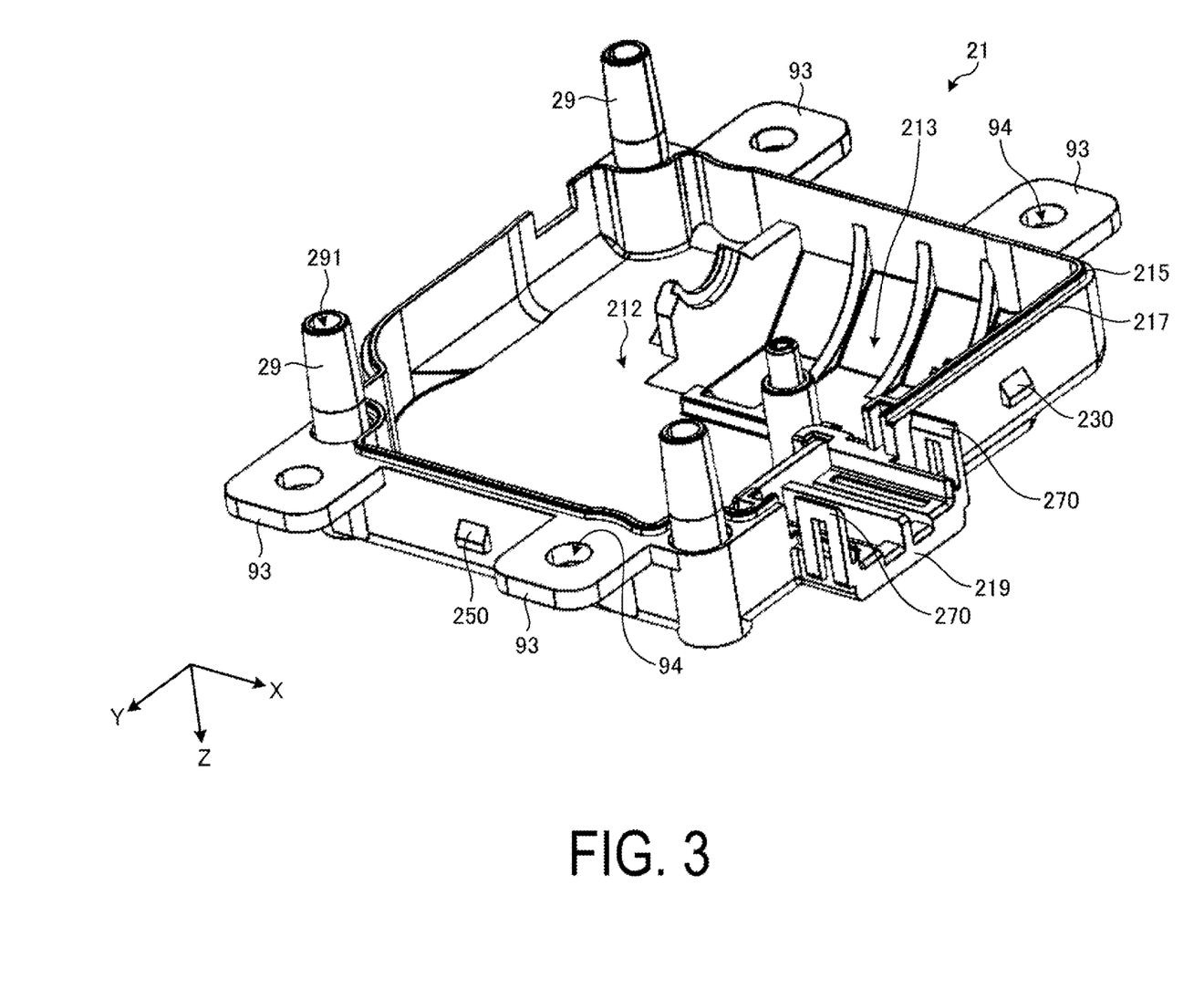
FIG. 3 is a perspective view illustrating an example of the first housing according to the embodiment.
Figure 4:
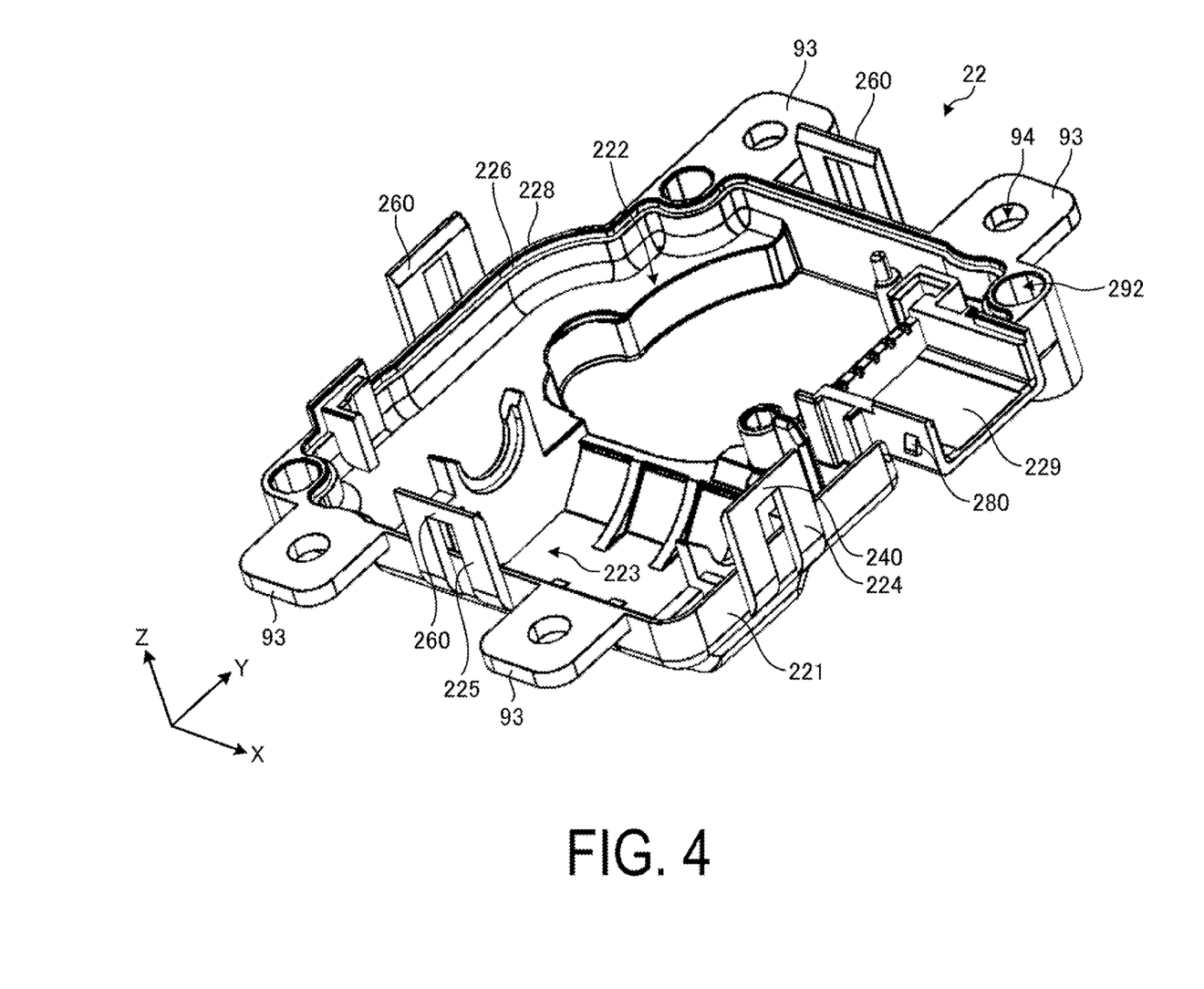
FIG. 4 is a perspective view illustrating an example of a second housing according to the embodiment.
Figure 5:
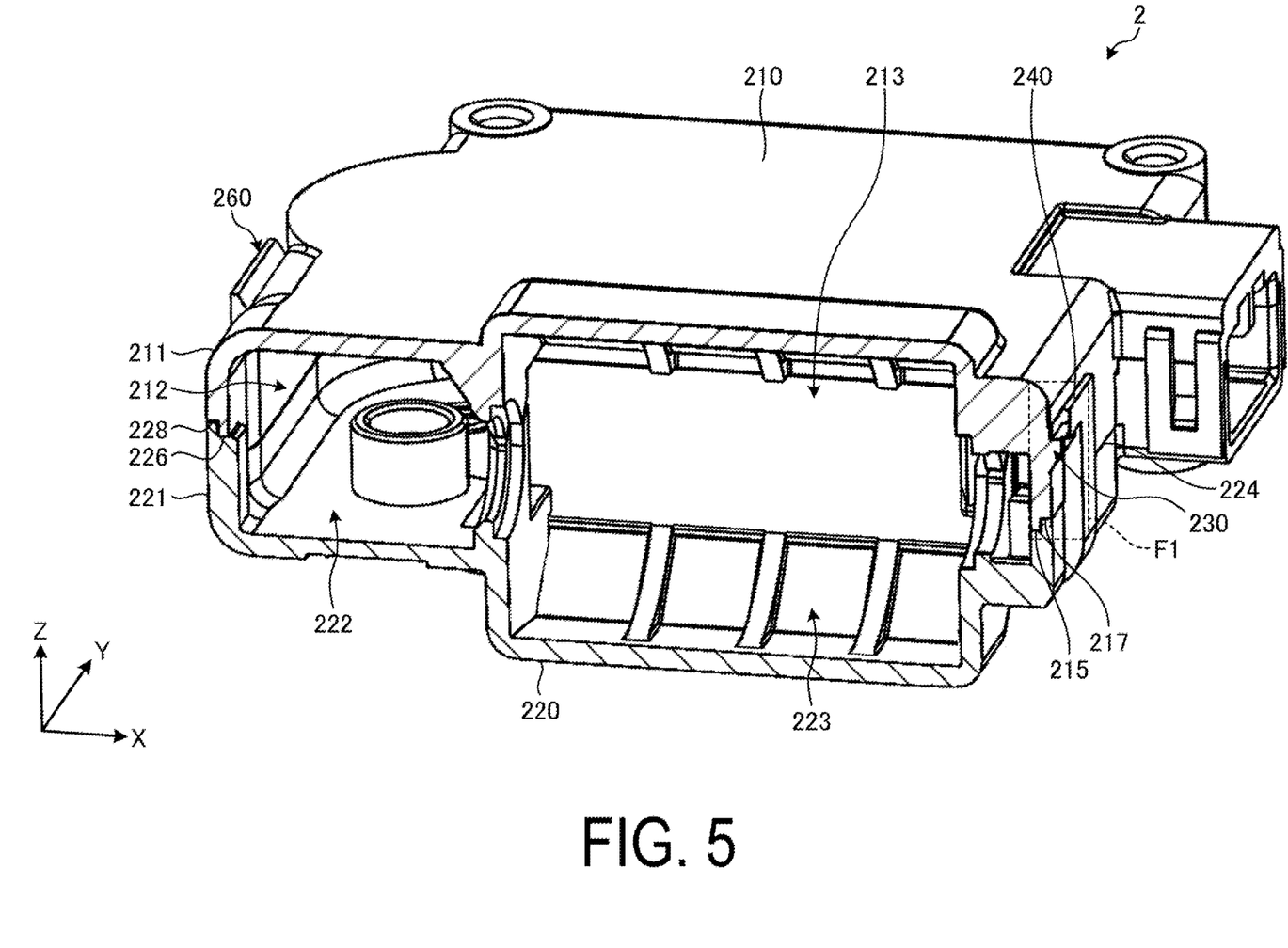
FIG. 5 is a cross-sectional perspective view illustrating an example of a housing according to the embodiment.
Figure 6:
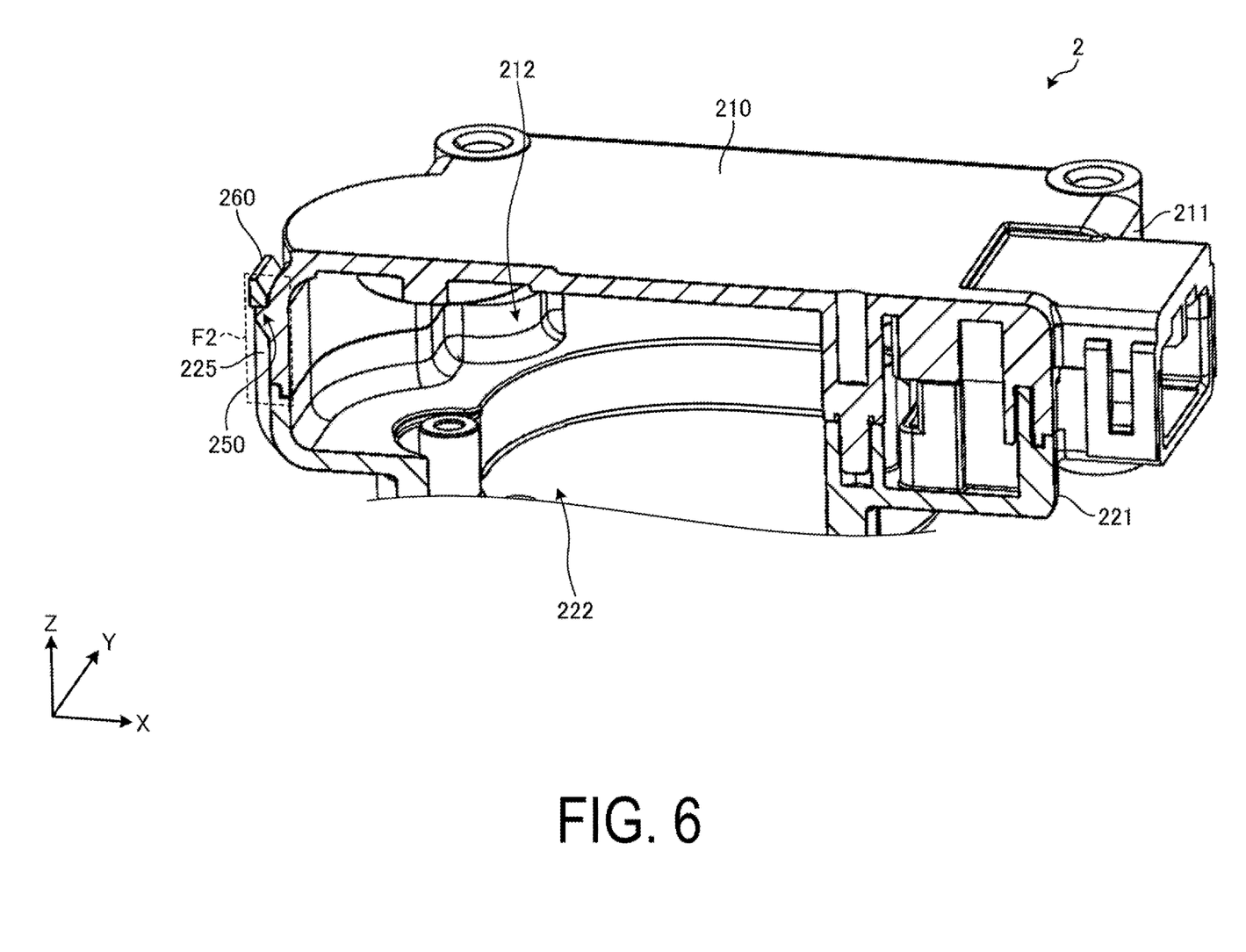
FIG. 6 is a cross-sectional perspective view illustrating another example of a housing according to the embodiment.

FIG. 1 is a perspective view illustrating an example of a rotating device according to the embodiment. FIG. 2 is a plan view illustrating the rotating device according to the embodiment with a first housing removed. FIG. 3 is a perspective view for describing an example of the first housing according to the embodiment. FIG. 4 is a perspective view for describing an example of a second housing according to the embodiment. FIG. 5 is a cross-sectional perspective view illustrating an example of a housing according to the embodiment. FIG. 6 is another cross-sectional perspective view illustrating an example of the housing according to the embodiment. FIG. 5 illustrates a cross section taken along a plane S1 in FIG. 1, and FIG. 6 illustrates a cross section taken along a plane S2 in FIG. 1. FIGS. 5 and 6 illustrate a first housing 21 and a second housing 22 in a joined state, and the internal structure of a rotating device 1 illustrated in FIG. 2 is not illustrated. For example, the rotating device 1 according to the embodiment can be suitably used as an actuator used in an air conditioning system for a vehicle and can control the turning operation of a louver for controlling air flow and the like.

As illustrated in FIGS. 1 and 2, the rotating device 1 according to the embodiment includes a housing 2 and the motor 3 and a set of gears 6 accommodated in the housing 2. As illustrated in FIGS. 1 and 5, the housing 2 includes the first housing 21 and the second housing 22 for engaging with the first housing 21. The first housing 21 and the second housing 22 oppose one another in the Z-axis direction. In other words, the housing 2 is configured so that the first housing 21 including an opening part 212 illustrated in FIG. 3 and the second housing 22 including an opening part 222 illustrated in FIG. 4 connect in the Z-axis direction with the opening parts 212 and 222 in an opposing state. The Z-axis direction is an example of a first direction.

As illustrated in FIG. 2, the rotating device 1 internally includes the motor 3, the plurality of gears (hereinafter referred to as a set of gears) 6 for transmitting power from the motor 3, a sensor 7 for detecting the rotation angle of an output gear 50 included in the set of gears 6, and the like. The motor 3 and the set of gears 6 are accommodated in the housing 2. The set of gears 6 is an example of a plurality of gears.

The set of gears 6 includes a worm 10 mounted at the rotation shaft 31 of the motor 3, a first transmission gear 61, a second transmission gear 62, and the output gear 50. Instead of the set of gears 6, the rotating device 1 may have a configuration including a single gear. As illustrated in FIG. 2, the first transmission gear 61 is located on the positive direction side of the worm 10 in the Y-axis direction.

Rotation of the worm 10 is transmitted to a helical gear 61a of the first transmission gear 61 and is transmitted to the second transmission gear 62 via a gear 61b coaxially provided with the helical gear 61a and having a smaller diameter than the helical gear 61a. The rotation of the second transmission gear 62 is transmitted to the output gear 50. The output gear 50 is provided with the output shaft 51. The rotation shafts of the first transmission gear 61 and the second transmission gear 62 extend in the direction (Z-axis direction) of the output shaft 51 and extend in a direction intersecting the rotation axis direction (X-axis direction) of the worm 10.

As described above, the rotation of the motor 3 is decelerated at a predetermined deceleration rate and output from the output shaft 51 to the outside. Then, the rotation angle of the output gear 50 is detected by the sensor 7. Information of the rotation angle of the output gear 50 detected by the sensor 7 is transmitted to the outside via a group of terminals 4 illustrated in FIG. 2, for example. The group of terminals 4 may be connected to the motor 3 via an FPC 8 illustrated in FIG. 2, for example. In each diagram, a hole part, in the housing 2, the output shaft 51 being passed through the hole part and the detailed internal structure of the housing 2 are omitted.

Note that the sensor 7 may detect the rotation speed rather than the rotation angle of the output gear 50 or may detect both the rotation angle and the rotation speed. In the present embodiment, a DC motor is employed as the motor 3, but a brushless motor or a stepping motor may be employed. In a case where a brushless motor or a stepping motor is employed, the rotating device 1 may not require the sensor 7.

As illustrated in FIG. 5, the first housing 21 includes a surface part 210 serving as a top surface part of the housing 2 and a side wall part 211 provided at an outer circumferential part of the surface part 210. The opening part 212 is surrounded by the side wall part 211. On the other hand, as illustrated in FIG. 5, the second housing 22 includes a surface part 220 serving as a bottom surface part of the housing 2 and a side wall part 221 provided at an outer circumferential part of the surface part 220. The opening part 222 is surrounded by the side wall part 221. Accommodating parts 213 and 223 accommodating the motor 3 illustrated in FIG. 2 are formed in the opening parts 212 and 222, respectively. The housing 2 is formed of resin material with elasticity or deformability, such as polypropylene, polyethylene terephthalate, ABS, or polycarbonate.

A tab (hereinafter, referred to as an attachment tab) 93 is formed, the tab outwardly protruding from each end part of one side of the first housing 21 and the second housing 22. The attachment tabs 93 are provided with holes (hereinafter, referred to as coupling holes) 94 accepting fasteners (not illustrated) as predetermined fixing members. The joined first housing 21 and second housing 22 are securely coupled together with the predetermined fasteners through the four coupling holes 94 to form the integrated housing 2.

In the configuration of the housing 2 described above, in the present embodiment, boss parts 29 are provided at corner parts of the side wall part 211 forming the outer circumferential part of the first housing 21, and second through holes 292 are provided at corner parts of the second housing 22. In other words, in the first housing 21, the cylindrical boss parts 29 including first through holes 291 are formed so as to protrude from the surface part 210, and fasteners, such as bolts and screws for example, can be inserted into the first through holes 291. The second housing 22 is provided with the second through holes 292 engaging with the boss parts 29.

A plurality of the boss parts 29 are provided, and a corresponding number of the second through holes 292 are also provided. The plurality of boss parts 29 are provided at a plurality of corner parts of the first housing 21, respectively, and the plurality of second through holes 292 are also provided at a plurality of corner parts of the second housing 22, respectively. In the present embodiment, the surface part 210 of the first housing 21 and the surface part 220 of the second housing 22 have a substantially rectangular shape in plan view, and the boss parts 29 and the second through holes 292 are provided at the corner parts. In the embodiment, the boss parts 29 and the second through holes 292 are formed at three of the four corner parts, but are not limited thereto, and may be provided at all four corner parts or may be provided at other locations.

Extending parts 219 and 229 corresponding to one another are formed at the first housing 21 and the second housing 22, respectively. The extending parts 219 and 229 protrude in the X-axis positive direction, that is the direction of the group of terminals 4 extending in the present embodiment. The extending parts 219 and 229 are joined together to form a connector part 209 illustrated in FIG. 1. The group of terminals 4 illustrated in FIG. 2 are held at the connector part 209.

The side wall part 221 of the second housing 22 includes a first hook 240, and the side wall part 211 of the first housing 21 includes a first protruding part 230 for engaging with the first hook 240. The first hook 240 is supported by a support part 224. The first protruding part 230 is integrally formed with an outer circumferential part of the side wall part 211 of the first housing 21. The first hook 240 and the support part 224 are integrally formed with the side wall part 221 of the second housing 22. In the embodiment, the first protruding part 230 and the first hook 240 are formed at the side wall parts 211 and 221 on the X-axis positive direction side, that is the side the extending part 219 extends. Hereinafter, the first protruding part 230 and the first hook 240 may be collectively referred to as a first engagement part.

As illustrated in FIG. 1, the second housing 22 includes a second hook 260, and the first housing 21 includes a second protruding part 250. The second hook 260 is supported by a support part 225. The second protruding part 250 is integrally formed with an outer circumferential part of the side wall part 211 of the first housing 21. The second hook 260 and the support part 225 are integrally formed with the side wall part 221 of the second housing 22. The second hook 260 engages with the second protruding part 250 of the first housing 21. In the embodiment, as illustrated in FIGS. 3 and 4, the second protruding part 250 and the second hook 260 are formed at the side wall parts 211 and 221, respectively, on the X-axis negative direction side, the Y-axis positive direction side, and the Y-axis negative direction side. Hereinafter, the second protruding part 250 and the second hook 260 may be collectively referred to as a second engagement part.

A hook may be formed at the first housing 21, and a protruding part may be formed at the second housing 22. In the embodiment, as illustrated in FIG. 1, a third hook 270 is formed at the extending part 219 of the first housing 21, and a third protruding part 280 is formed at the extending part 229 of the second housing 22.

As illustrated in FIG. 3, a first opposing surface 215 protruding in the Z-axis negative direction and a second opposing surface 217 located on the Z-axis positive direction side are formed at the end part of the side wall part 211 of the first housing 21 on the Z-axis negative direction side. In the embodiment, the first opposing surface 215 is formed at a position further inward, that is, closer to the opening part 212, than the second opposing surface 217. In a similar manner, as illustrated in FIG. 4, a fourth opposing surface 228 protruding in the Z-axis positive direction and a third opposing surface 226 located on the Z-axis negative direction side are provided at the end part of the side wall part 221 of the second housing 22 on the Z-axis positive direction side. As illustrated in FIG. 4, the third opposing surface 226 is formed at a position further inward, that is, closer to the opening part 222, than the fourth opposing surface 228. The first opposing surface 215 and the second opposing surface 217 are examples of end parts of a side wall part of a first housing, and the third opposing surface 226 and the fourth opposing surface 228 are examples of end parts of a side wall part of a second housing.

In the embodiment, as illustrated in FIGS. 5 and 6, in the housing 2, the fourth opposing surface 228 of the second housing 22 is formed at a position opposing the second opposing surface 217 of the first housing 21, and the third opposing surface 226 is formed at a position opposing the first opposing surface 215. With this configuration, the first opposing surface 215 and the second opposing surface 217 engage with the fourth opposing surface 228 and the third opposing surface 226.

In this manner, the housing 2 illustrated in FIG. 1 is formed by abutting the first housing 21 and the second housing 22 against one another. In other words, by engaging the first hook 240 of the second housing 22 with the first protruding part 230 of the first housing 21, the first housing 21 and the second housing 22 are integrated, and the housing 2 accommodating the motor 3, the set of gears 6, and the like described above is formed.

Figure 7:
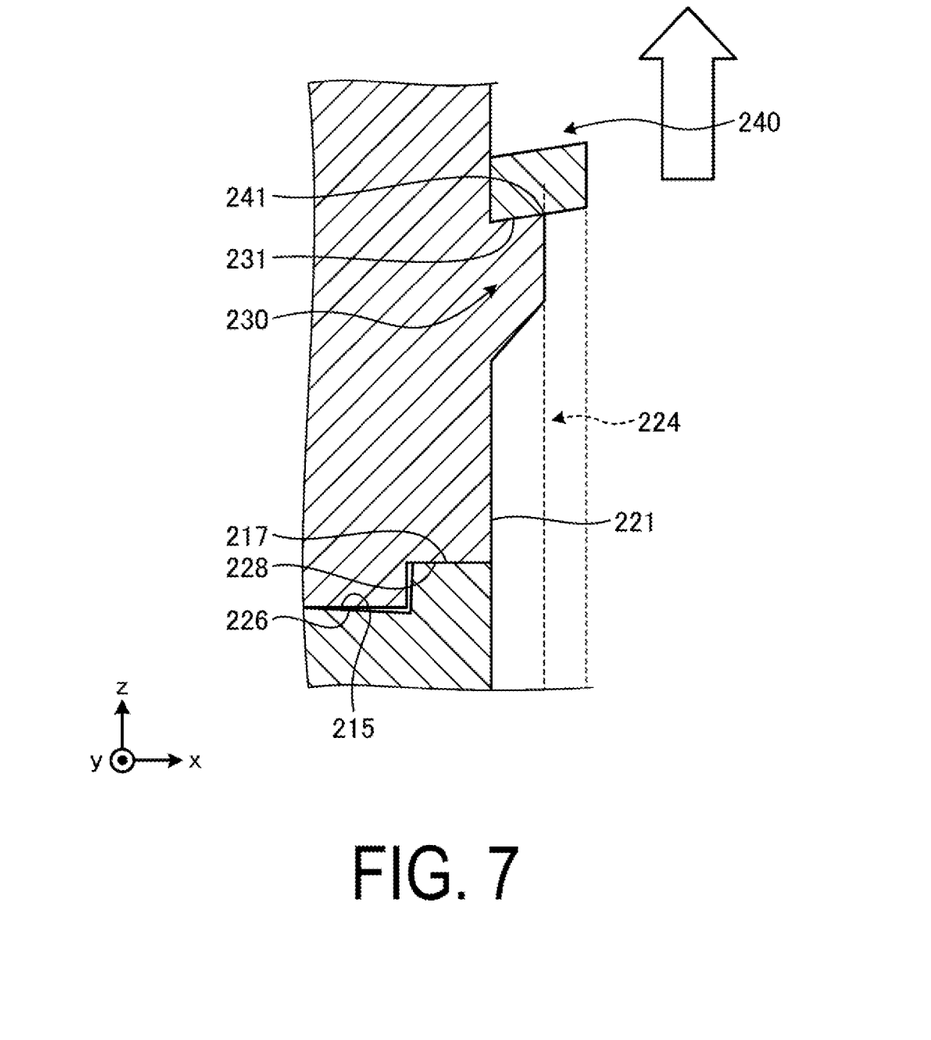
FIG. 7 is a cross-sectional view illustrating an example of a first engagement part of the rotating device according to the embodiment.
Figure 8:
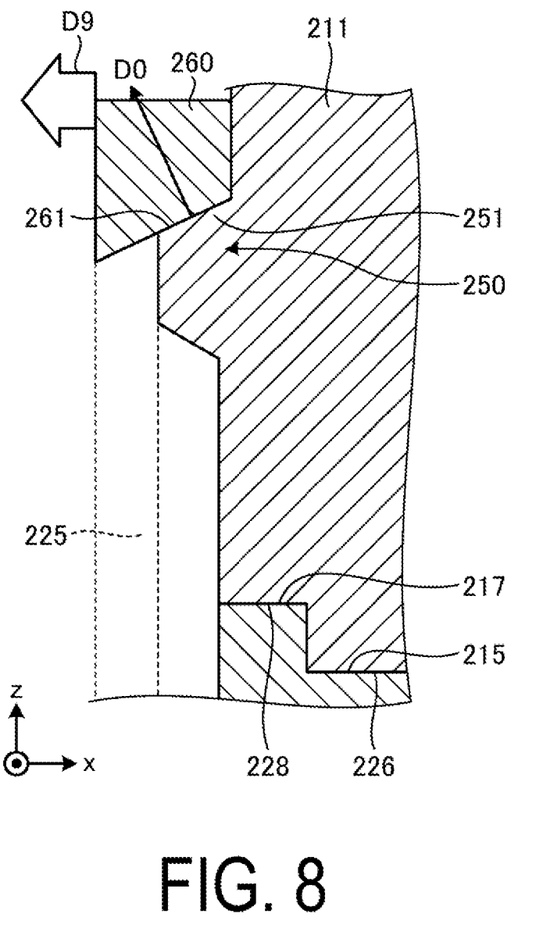
FIG. 8 is a cross-sectional view illustrating an example of a second engagement part of the rotating device according to the embodiment.

In the embodiment, as illustrated in FIGS. 7 and 8, the shape of the first engagement part is different from the shape of the second engagement part. FIG. 7 is a cross-sectional view illustrating an example of the first engagement part of the rotating device according to the embodiment. FIG. 8 is a cross-sectional view illustrating an example of the second engagement part of the rotating device 1 according to the embodiment. FIG. 7 is an enlarged view of a portion illustrated in a frame F1 in FIG. 5. FIG. 8 is an enlarged view of a portion illustrated in a frame F2 in FIG. 6. In FIG. 7, the support part 224 of the second housing 22, not present on the plane S1 illustrated in FIG. 1, is illustrated with a dashed line. The same applies to FIG. 9 described below. In FIG. 8, the support part 225 of the second hook 260 of the second housing 22, not present on the plane S2 illustrated in FIG. 1, is illustrated with a dashed line.

As illustrated in FIG. 7, the first hook 240 formed at the second housing 22 includes an inclined surface 241. The inclined surface 241 is in contact with the first protruding part 230 formed at the first housing 21. Specifically, in the Z-axis direction, the inclined surface 241 of the first hook 240 engaging with the first protruding part 230 and an inclined surface 231 of the first protruding part 230 engaging with the first hook 240 are in contact with one another. In a similar manner, as illustrated in FIG. 8, an inclined surface 261 of the second hook 260 formed at the second housing 22 is in contact with an inclined surface 251 of the second protruding part 250 formed at the first housing 21. The inclined surface 241 is an example of a surface of a first hook, and the inclined surface 231 is an example of a surface of a first protruding part.

As illustrated in FIG. 8, the inclined surface 261 of the second hook 260 is inclined so as to oppose the side wall part 211 of the first housing 21. In other words, the inclined surface 251 of the second protruding part 250 faces the outside of the second housing 22, and the inclined surface 261 of the second hook 260 faces the inside of the second housing 22. The inclined surfaces 251 and 261 may extend in the X-axis direction, that is, a direction substantially orthogonal to the Z-axis direction, for example. In this case, the inclined surfaces 251 and 261 face a direction substantially orthogonal to the side wall part 221 of the second housing 22.

As illustrated in FIG. 7, the inclined surface 231 of the first protruding part 230 faces the side wall part 211 of the first housing 21. The inclined surface 241 of the first hook 240 is formed inclined at substantially the same angle as the inclined surface 231. That is, the inclined surface 241 faces the direction away from the side wall part 221 of the second housing 22. In this case, the inclined surface 231 of the first protruding part 230 faces the inside of the first housing 21, and the inclined surface 241 of the first hook 240 faces outward from the side wall part 221 of the first housing 21. That is, the first protruding part 230 and the first hook 240 according to the embodiment have a so-called reverse tapered shape.

Figure 9:
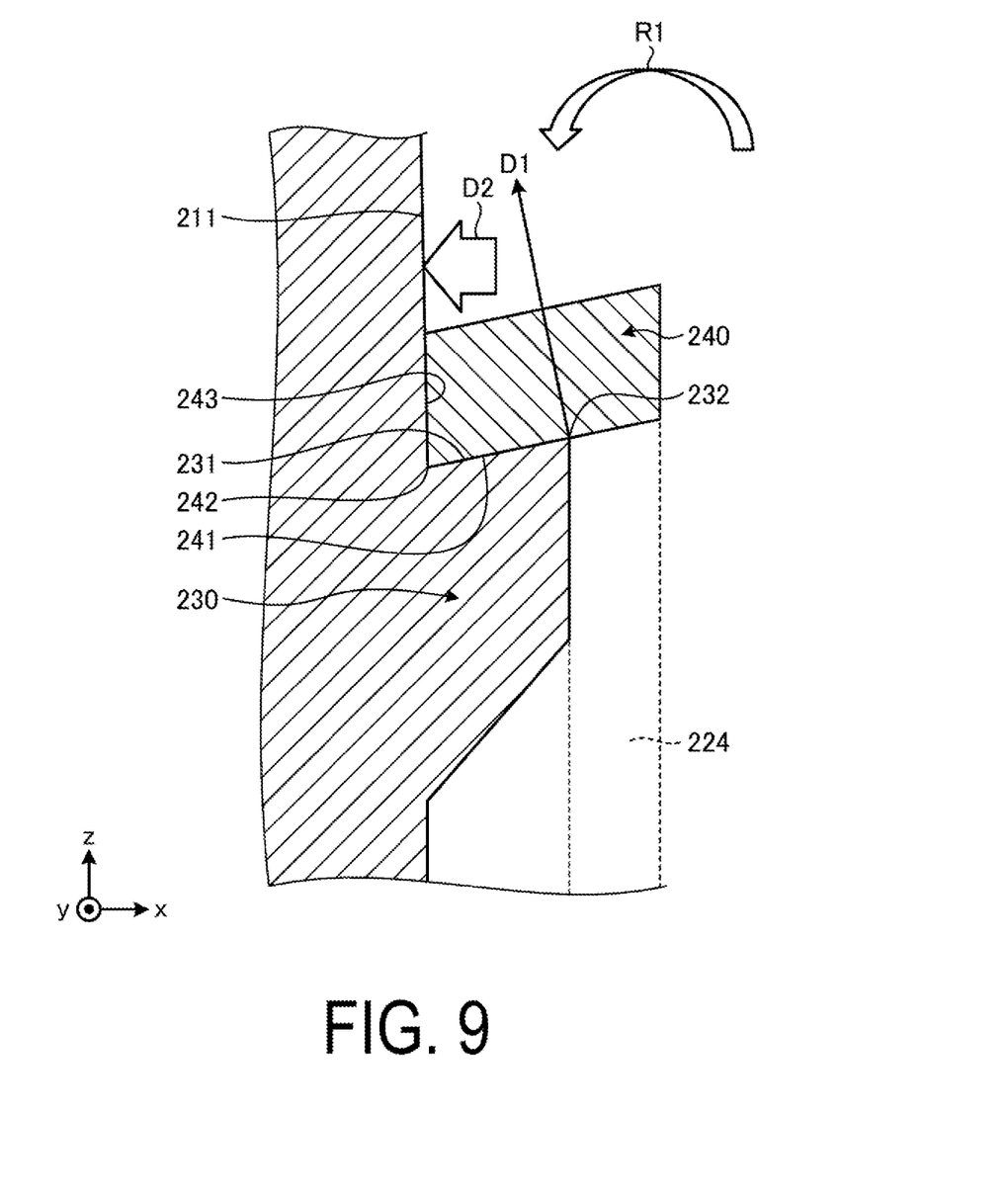
FIG. 9 is an enlarged cross-sectional view illustrating an example of the first engagement part of the rotating device according to the embodiment.

The first hook 240 is in contact with the side wall part 211 of the first housing 21. Specifically, as illustrated in FIG. 9, a side surface 243 of the first hook 240 is in contact with the side wall part 211 of the first housing 21. FIG. 9 is an enlarged cross-sectional view illustrating an example of the first engagement part of the rotating device according to the embodiment. As illustrated in FIG. 9, the side surface 243 of the first hook 240 extends in substantially the same direction as the Z-axis direction. The portion, opposing the side surface 243, of the side wall part 211 of the first housing 21 extends in substantially the same direction as the Z-axis direction.

In the housing 2, when an external force acts in the direction of separation for the first housing 21 and the second housing 22, the reaction force applied to the hook and the protruding part acts perpendicular to the tangent line at the contact surface of contact between the hook and the protruding part. For example, the force acts in the direction indicated by an arrow DO at the second hook 260 and the second protruding part 250 illustrated in FIG. 8. In this case, a force acting in a direction D9 of separation of the second hook 260 from the second protruding part 250 is applied at the second hook 260.

On the other hand, a reaction force applied at the first hook 240 and the first protruding part 230 acts in a direction of separation for the first protruding part 230 and the first hook 240 as indicated by an arrow D1 in FIG. 9. However, since the inclined surface 231 of the first protruding part 230 faces the inside of the second housing 22 and the inclined surface 241 of the first hook 240 faces the outside of the second housing 22, the first hook 240 is prevented from being separated from the first protruding part 230.

Specifically, as indicated by an arrow D2 in FIG. 9, the side surface 243 of the first hook 240 is pressed against the side wall part 211 of the first housing 21 by the stress indicated by the arrow D1 in FIG. 9. When a directional rotating moment indicated by an arrow R1 in FIG. 9 is further applied at the first hook 240, the first hook 240 is pressed against the side wall part 211 and the first protruding part 230 of the first housing 21. Consequently, the second housing 22 provided with the first hook 240 is prevented from separating from the first housing 21.

As illustrated in FIG. 8, at the second hook 260, the inclined surface 261 in contact with the second protruding part 250 opposes the side wall part 211 of the first housing 21 in the direction indicated by the arrow D0. On the other hand, when the first hook 240 and the first protruding part 230 are in an engaged state, the inclined surface 231 of the first protruding part 230 and the inclined surface 241 of the first hook 240 face one another in the direction indicated by the arrow D1 in FIG. 9, that is the direction of inclination with respect to the Z-axis direction.

When the first hook 240 is attached to the first protruding part 230 or detached from the first protruding part 230, a distal end part 242 of the first hook 240 illustrated in FIG. 9 is required to move to the Z-axis positive direction side of a distal end part 232 of the first protruding part 230. In the embodiment, when the first hook 240 is attached to the first protruding part 230, for example, the first hook 240 is pulled up in the direction of the arrow in FIG. 7 utilizing extension and contraction of the member (for example, resin) forming the housing 2, and the distal end part 242 of the first hook 240 is moved to the Z-axis positive direction side of the distal end part 232 of the first protruding part 230.

As described above, the rotating device 1 according to the embodiment includes the housing 2 including the first housing 21 and the second housing 22 for engaging with the first housing 21 and the motor 3 and the one or more gears 6 accommodated in the housing 2. The first housing 21 and the second housing 22 oppose one another in the first direction, the side wall part 221 of the second housing 22 includes the first hook 240, and the side wall part 211 of the first housing 21 includes the first protruding part 230 for engaging with the first hook 240. In the first direction, the surface 241 of the first hook 240 engaging with the first protruding part 230 and the surface 231 of the first protruding part 230 engaging with the first hook 240 are in contact with one another. The surface of one of the first hook 240 and the first protruding part 230 is inclined with respect to the surface of the other of the first hook 240 and the first protruding part 230, and the surface 231 of the first protruding part 230 faces the side wall part 211 of the first housing 21. According to this configuration, the first hook 240 is prevented from being separated from the first protruding part 230 by the inclined surface 241 included in the first engagement part and a reaction force acting on the inclined surface 241 even when an external force acts in the direction of separation for the first housing 21 and the second housing 22. Thus, noise-reduction of the rotating device 1 including the worm 10 can be achieved.

Modifications

The configurations of the present embodiment have been described above, but the embodiment is not limited to these configurations. For example, a hook with a reverse tapered shape may be formed at the first housing 21, and a protruding part with a reverse tapered shape may be formed at the second housing 22.

The reverse tapered shape is preferably formed at the engagement part easily stressed by vibration and the like near the motor 3, for example. However, the housing 2 may include a combination of a plurality of engagement parts with a reverse tapered shape, and all of the engagement parts may be formed with a reverse tapered shape. For example, the second hook 260 and the second protruding part 250 or the third hook 270 and the third protruding part 280 may have a reverse tapered shape like the first hook 240 and the first protruding part 230.

Either the hook or the protruding part forming an engagement part may have a reverse tapered shape. In this case, for example, when only the hook is formed with a reverse tapered shape, the stress applied from the protruding part to the hook is applied in the opposite direction to the arrow R1 illustrated in FIG. 9, making the hook easy to separate from the protruding part. Thus, when only either the hook or the protruding part has a reverse tapered shape, preferably, only the protruding part has a reverse tapered shape.

The embodiment and the modifications of the present disclosure have been described, but the present invention is not limited to the embodiment and the modifications but can be variously modified without departing from the spirit of the present invention. Various modifications within a scope not departing from the gist are included in the technical scope of the present invention, and this is obvious to a person having skill in the art from the description of the claims.

REFERENCE SIGNS LIST

1 Rotating device, 2 Housing, 3 Motor, 4 Group of terminals, 6 Set of gears, 7 Sensor, 8 FPC, 10 Worm, 21 First housing, 22 Second housing, 29 Boss part, 31 Rotation shaft, 50 Output gear, 51 Output shaft, 61 First transmission gear, 61a Helical gear, 61b Gear, 62 Second transmission gear, 93 Attachment tab, 94 Coupling hole, 209 Connector part, 210, 220 Surface part, 211, 221 Side wall part, 212, 222 Opening part, 215 First opposing surface, 217 Second opposing surface, 219, 229 Extending part, 226 Third opposing surface, 228 Fourth opposing surface, 230 First protruding part, 240 First hook, 250 Second protruding part, 260 Second hook, 270 Third hook, 280 Third protruding part, 231, 241, 251, 261 Inclined surface, 232, 242 Distal end part, 243 Side surface, 291 First through hole, 292 Second through hole

The invention claimed is:

1. A rotating device, comprising:
a housing including a first housing and a second housing, the second housing being configured to engage with the first housing; and
a motor and one or more gears accommodated in the housing, wherein
the first housing and the second housing oppose one another in a first direction,
a side wall part of the second housing is provided with a first hook and a second hook,
a side wall part of the first housing is provided with a first protruding part configured to engage with the first hook and a second protruding part configured to engage with the second hook, an inclined surface of the first hook configured to engage with the first protruding part and an inclined surface of the first protruding part configured to engage with the first hook are in contact with one another in the first direction, the inclined surface of the first protruding part faces inside the side wall part of the first housing, the inclined surface of the first hook faces outside the side wall part of the first housing, an inclined surface of the second hook configured to engage with the second protruding part and an inclined surface of the second protruding part configured to engage with the second hook are in contact with one another in the first direction, the inclined surface of the second protruding part faces outside the side wall part of the first housing, and the inclined surface of the second hook faces inside the side wall part of the first housing.

2. The rotating device according to claim 1, wherein an end part of the side wall part of the first housing and an end part of the side wall part of the second housing engage with one another.

3. The rotating device according to claim 1, wherein the first hook is in contact with the side wall part of the first housing.

* * * * *